United States Patent
Rooney et al.

(10) Patent No.: US 7,901,075 B2
(45) Date of Patent: Mar. 8, 2011

(54) LASER ENHANCED LENS

(75) Inventors: Thomas R. Rooney, Jacksonville, FL (US); Michael F. Widman, Jacksonville, FL (US); Shivkumar Mahadevan, Orange Park, FL (US)

(73) Assignee: Johnson & Johnson Vision Care, Inc., Jacksonville, FL (US)

( * ) Notice: Subject to any disclaimer, the term of this patent is extended or adjusted under 35 U.S.C. 154(b) by 124 days.

(21) Appl. No.: 12/341,145

(22) Filed: Dec. 22, 2008

(65) Prior Publication Data
US 2009/0168014 A1    Jul. 2, 2009

Related U.S. Application Data

(60) Provisional application No. 61/016,840, filed on Dec. 27, 2007.

(51) Int. Cl.
*G02C 7/02*    (2006.01)
(52) U.S. Cl. .......................... 351/177; 351/178; 351/159
(58) Field of Classification Search .................. 351/177
See application file for complete search history.

(56) References Cited

U.S. PATENT DOCUMENTS

| | | | |
|---|---|---|---|
| 5,257,706 A | 11/1993 | McIntyre | |
| 5,439,642 A | 8/1995 | Hagmann | |
| 6,743,486 B1 * | 6/2004 | Miyazawa | 427/596 |
| 2005/0046792 A1 * | 3/2005 | Ito et al. | 351/177 |
| 2005/0105048 A1 | 5/2005 | Warden | |
| 2007/0097318 A1 | 5/2007 | Chehab | |
| 2008/0051012 A1 * | 2/2008 | Akiyama et al. | 451/42 |
| 2008/0111969 A1 * | 5/2008 | Covarrubias et al. | 351/178 |

FOREIGN PATENT DOCUMENTS

| | | |
|---|---|---|
| DE | 10316576 B3 | 11/2004 |
| EP | 457612 A2 | 11/1991 |
| FR | 2685629 A1 | 7/1993 |

OTHER PUBLICATIONS

PCT International Search Report, dated Apr. 28, 2009, for PCT Int'l. Appln. No. PCT/US2008/014010.

* cited by examiner

*Primary Examiner* — Jessica T Stultz
(74) *Attorney, Agent, or Firm* — Joseph P. Kincart

(57) ABSTRACT

This invention discloses methods and apparatus for modifying a silicone contact lens via laser ablation and a resulting modified lens. In some embodiments a lens is ablated in a hydrated state. A lens may also be ablated in an environment of decreased oxygen content.

16 Claims, 5 Drawing Sheets

```
┌─────────────────────────────────────────────┐
│ CREATING A MOLD PART COMPRISING A           │
│          THERMOPLASTIC RESIN            301 │
└─────────────────────────────────────────────┘
                       │
┌─────────────────────────────────────────────┐
│ DISPENSING A LENS FORMULATION INTO THE      │
│              MOLD PART                  302 │
└─────────────────────────────────────────────┘
                       │
┌─────────────────────────────────────────────┐
│       CURING THE LENS FORMULATION           │
│                                         303 │
└─────────────────────────────────────────────┘
                       │
┌─────────────────────────────────────────────┐
│       RELEASING THE LENS FROM THE MOLD      │
│                                         304 │
└─────────────────────────────────────────────┘
                       │
┌─────────────────────────────────────────────┐
│       POSITION THE LENS ON A MANDREL        │
│                                         305 │
└─────────────────────────────────────────────┘
                       │
┌─────────────────────────────────────────────┐
│       EXPOSE THE LENS TO LASER ENERGY       │
│                                         306 │
└─────────────────────────────────────────────┘
                       │
┌─────────────────────────────────────────────┐
│        ABLATE A PORTION OF THE LENS         │
│                                         307 │
└─────────────────────────────────────────────┘
                       │
┌─────────────────────────────────────────────┐
│        WASH KERF FORM LENS SURFACE          │
│                                         308 │
└─────────────────────────────────────────────┘
                       │
┌─────────────────────────────────────────────┐
│        APPLY COATING TO LENS SURFACE        │
│                                         309 │
└─────────────────────────────────────────────┘
```

FIG. 3

LASER ENHANCED LENS

This application is a non-provisional filing of a provisional application, U.S. Ser. No. 61/016,840, filed on Dec. 27, 2007.

FIELD OF USE

This invention describes ophthalmic lenses formed via cast molding and modified with a laser according to post manufacturing criteria.

BACKGROUND

Soft contact lenses are popular and often more comfortable to wear than contact lenses made of hard materials. Malleable contact lenses made of silicone based hydrogels can be manufactured by forming a lens in a multi-part cast mold where the combined parts form a topography consistent with the desired final lens. A first mold part can include a convex portion that corresponds with a back curve of an ophthalmic lens and a second mold part can include a concave portion that corresponds with a front curve of the ophthalmic lens.

A typical cast mold process involves depositing a monomer material in a cavity defined between optical surfaces of opposing mold parts. The mold parts are brought together to shape the lens formulation according to desired lens parameters. The lens formulation is cured, for example by exposure to heat and light, thereby forming a lens.

Following cure, the mold parts are separated, a process sometimes referred to as demolding. Typically, the demold process results in the formed lens remaining adhered to a remaining mold portion. Exposure to a hydration solution will typically hydrate the newly formed ophthalmic lens and facilitate its separation from the remaining mold part.

Design variations for each lens are limited to the design of the cast molds used to form the lenses. Consequently manufactured designs are usually limited to sizes and shapes conducive to wear by large numbers of people. It is possible to change out lens inserts for small runs of a specific lens design, however, the cost of tooling and the automated nature of manufacturing lines makes it economically realistic to only run relatively large batches of a certain lens design before switching over to a next lens design.

It is desirable therefore to have improved processes to facilitate contact lens release in aqueous solutions.

SUMMARY

Accordingly, the present invention includes processes for modifying a lens after the lens has been formed. According to the present invention, a lens is formed, such as, for example via cast molding by curing a reactive mixture in a cavity of a desired shape formed by two or more plastic mold parts. The lens is separated from one or both of the mold parts and controllably irradiated with a laser beam to ablate portions of the lens and thereby modify the lens.

In some embodiments, modifications are based upon one or more of: metrics of a patient's eye; metrics of a patient's sight and a desired result of wearing the modified lens. A desired result may include, for example, improved performance during a sport or other activity, such as flying an aircraft or reading.

The ophthalmic lens can include, for example, a silicone hydrogel formulation or a hydrogel formulation. Specific examples can include a lens formed from: acquafilcon A, balafilcon A, and lotrafilcon A, genfilcon A, lenefilcon A, polymacon and galyfilcon A, and senofilcon A.

DESCRIPTION OF THE DRAWINGS

FIG. 3 illustrates a flow chart of exemplary steps that can be executed while implementing some embodiments of the present invention.

DETAILED DESCRIPTION OF THE INVENTION

Figure 1:
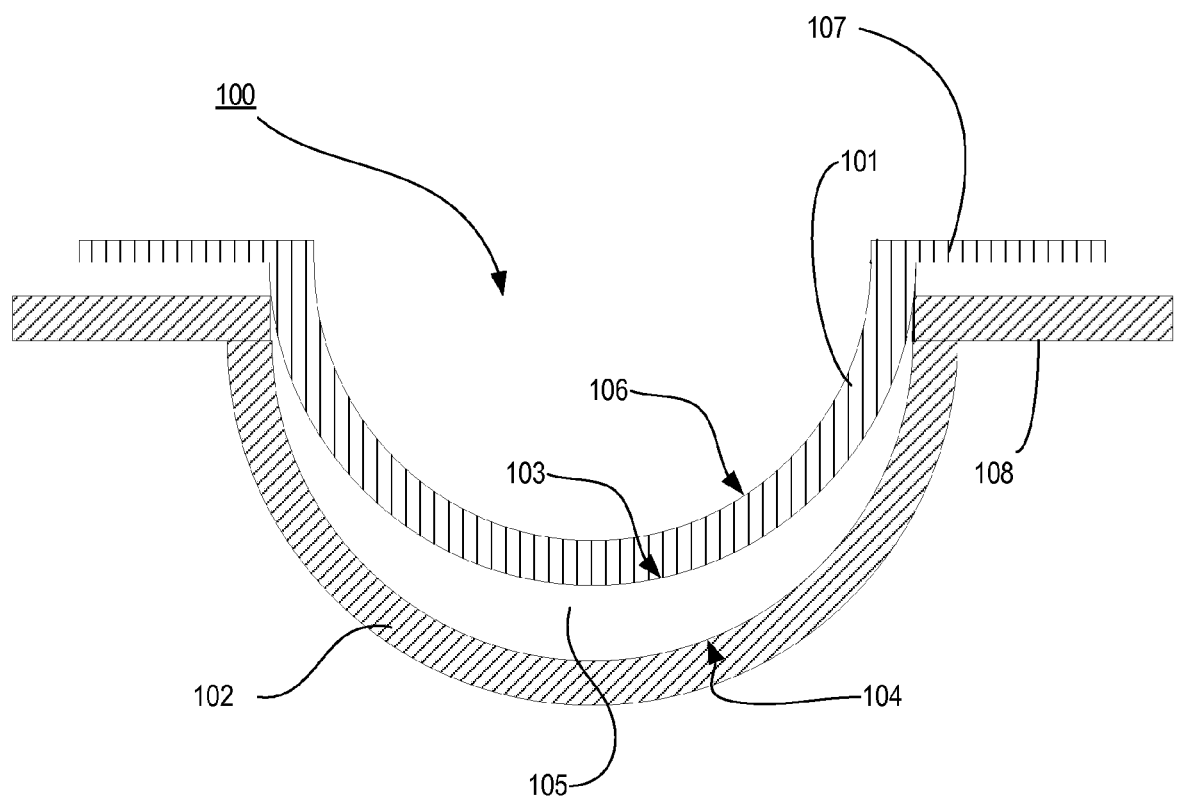
FIG. 1 illustrates a cast mold for forming an ophthalmic lens.

The present invention includes methods for modifying an ophthalmic lens with a laser and a modified ophthalmic lens. According to some embodiments of the present invention, at least one portion of an ophthalmic lens is irradiated with a laser thereby modifying at least one characteristic of the ophthalmic lens. In some embodiments, a portion of the ophthalmic lens is ablated and is no longer part of the lens. In other embodiments, energy from the irradiation changes a physical quality of the lens material remaining, such as a refractive characteristic or modulus of the lens material.

An ophthalmic lens may be formed in numerous ways known in the art, such as, for example, cast molding, lathing and injection molding. Preferred embodiments include cast molding as are discussed more fully below in relation to the various figures.

According to the present invention, a lens can be modified via the application of laser energy on the lens. Modifications can be made according to the needs of a particular patient, for example to address a high order aberration. Other embodiments may include a laser modification to manifest a desired design modification, such as an edge formation or tear path.

In some preferred embodiments one or more of an excimer laser and an exciplex laser are used to modify a formed lens. The excimer laser can typically provide a laser light in the ultrviolet range, although other wavelengths are within the scope of the present invention. Ultraviolet light from an excimer laser is well absorbed by organic compounds, such as the lens material. The present invention provides for delivery of ultraviolet laser light to an ophthalmic lens in an intesity and duration sufficient to disrupt the molcular bonds and ablate some lens material without significant burning or cutting of the lens material. Ablation is the relase of lensmolecules from the lens into a surrounding atmosphere.

By way of example, wavelengths of lasers used in conjunction with the present invention can include between about 125 nanometers to about 350 nanometers. Some examplary excimers and associated wavelengths therefore include:

| | |
|---|---|
| $Ar_2^*$ | 126 nm |
| $Kr_2^*$ | 146 nm |
| $F_2$ | 157 nm |
| $Xe_2^*$ | 172 & 175 nm |
| ArF | 193 nm |
| KrF | 248 nm |
| XeBr | 282 nm |
| XeCl | 308 nm |

| | |
|---|---|
| XeF | 351 nm |
| CaF$_2$ | 193 nm |
| KrCl | 222 nm |
| Cl$_2$ | 259 nm |
| N$_2$ | 337 nm |

The excimer lasers can be operated at a pulse rate of around 100 Hz with a pulse duration of about between 8 nanoseconds and 30 nanoseconds. Focus of a laser can be set to approximately 0.25 micrometers or larger.

In some preferred embodiments, mold parts are fashioned from a thermoplastic resin, such as polyolefin resin, to produce single use cast molds used to fashion the lens. Injection molding apparatus will typically include precision tooling that has been machined from a metal, such as, for example, brass, stainless steel or nickel or some combination thereof. Tooling is fashioned in a desired shape and machined or polished to achieve precision surface quality. After formation of a lens according to the shape of the cast mold, the lens is modified via application of laser energy.

Lenses

As used herein "lens" refers to any ophthalmic device that resides in or on the eye. These devices can provide optical correction or may be cosmetic. For example, the term lens can refer to a contact lens, intraocular lens, overlay lens, ocular insert, optical insert or other similar device through which vision is corrected or modified, or through which eye physiology is cosmetically enhanced (e.g. iris color) without impeding vision.

As used herein, the term "lens forming mixture" refers to a mixture of materials that can react, or be cured, to form an ophthalmic lens. Such a mixture can include polymerizable components (monomers), additives such as UV blockers and tints, photoinitiators or catalysts, and other additives one might desire in an ophthalmic lens such as a contact or intraocular lens.

In some embodiments, a preferred lens type can include a lens that includes a silicone containing component. A "silicone-containing component" is one that contains at least one [—Si—O—] unit in a monomer, macromer or prepolymer. Preferably, the total Si and attached O are present in the silicone-containing component in an amount greater than about 20 weight percent, and more preferably greater than 30 weight percent of the total molecular weight of the silicone-containing component. Useful silicone-containing components preferably comprise polymerizable functional groups such as acrylate, methacrylate, acrylamide, methacrylamide, vinyl, N-vinyl lactam, N-vinylamide, and styryl functional groups.

Suitable silicone containing components include compounds of Formula I

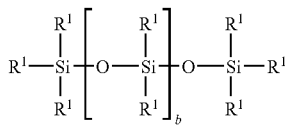

where
R$^1$ is independently selected from monovalent reactive groups, monovalent alkyl groups, or monovalent aryl groups, any of the foregoing which may further comprise functionality selected from hydroxy, amino, oxa, carboxy, alkyl carboxy, alkoxy, amido, carbamate, carbonate, halogen or combinations thereof; and monovalent siloxane chains comprising 1-100 Si—O repeat units which may further comprise functionality selected from alkyl, hydroxy, amino, oxa, carboxy, alkyl carboxy, alkoxy, amido, carbamate, halogen or combinations thereof;

where b=0 to 500, where it is understood that when b is other than 0, b is a distribution having a mode equal to a stated value;

wherein at least one R$^1$ comprises a monovalent reactive group, and in some embodiments between one and 3 R$^1$ comprise monovalent reactive groups.

As used herein "monovalent reactive groups" are groups that can undergo free radical and/or cationic polymerization. Non-limiting examples of free radical reactive groups include (meth)acrylates, styryls, vinyls, vinyl ethers, C$_{1-6}$alkyl(meth)acrylates, (meth)acrylamides, C$_{1-6}$alkyl(meth)acrylamides, N-vinyllactams, N-vinylamides, C$_{2-12}$alkenyls, C$_{2-12}$alkenylphenyls, C$_{2-12}$alkenylnaphthyls, C$_{2-6}$alkenylphenylC$_{1-6}$alkyls, O-vinylcarbamates and O-vinylcarbonates. Non-limiting examples of cationic reactive groups include vinyl ethers or epoxide groups and mixtures thereof. In one embodiment the free radical reactive groups comprises (meth)acrylate, acryloxy, (meth)acrylamide, and mixtures thereof.

Suitable monovalent alkyl and aryl groups include unsubstituted monovalent C$_1$ to C$_{16}$alkyl groups, C$_6$-C$_{14}$ aryl groups, such as substituted and unsubstituted methyl, ethyl, propyl, butyl, 2-hydroxypropyl, propoxypropyl, polyethyleneoxypropyl, combinations thereof and the like.

In one embodiment b is zero, one R$^1$ is a monovalent reactive group, and at least 3 R$^1$ are selected from monovalent alkyl groups having one to 16 carbon atoms, and in another embodiment from monovalent alkyl groups having one to 6 carbon atoms. Non-limiting examples of silicone components of this embodiment include 2-methyl-,2-hydroxy-3-[3-[1,3,3,3-tetramethyl-1-[(trimethylsilyl)oxy]disiloxanyl]propoxy]propyl ester ("SiGMA"),
2-hydroxy-3-methacryloxypropyloxypropyl-tris(trimethylsiloxy)silane,
3-methacryloxypropyltris(trimethylsiloxy)silane ("TRIS"),
3-methacryloxypropylbis(trimethylsiloxy)methylsilane and
3-methacryloxypropylpentamethyl disiloxane.

In another embodiment, b is 2 to 20, 3 to 15 or in some embodiments 3 to 10; at least one terminal R$^1$ comprises a monovalent reactive group and the remaining R$^1$ are selected from monovalent alkyl groups having 1 to 16 carbon atoms, and in another embodiment from monovalent alkyl groups having 1 to 6 carbon atoms. In yet another embodiment, b is 3 to 15, one terminal R$^1$ comprises a monovalent reactive group, the other terminal R$^1$ comprises a monovalent alkyl group having 1 to 6 carbon atoms and the remaining R$^1$ comprise monovalent alkyl group having 1 to 3 carbon atoms. Non-limiting examples of silicone components of this embodiment include (mono-(2-hydroxy-3-methacryloxypropyl)-propyl ether terminated polydimethylsiloxane (400-1000 MW)) ("OH-mPDMS"), monomethacryloxypropyl terminated mono-n-butyl terminated polydimethylsiloxanes (800-1000 MW), ("mPDMS").

In another embodiment b is 5 to 400 or from 10 to 300, both terminal R$^1$ comprise monovalent reactive groups and the remaining R$^1$ are independently selected from monovalent alkyl groups having 1 to 18 carbon atoms which may have ether linkages between carbon atoms and may further comprise halogen.

In one embodiment, where a silicone hydrogel lens is desired, the lens of the present invention will be made from a reactive mixture comprising at least about 20 and preferably between about 20 and 70% wt silicone containing components based on total weight of reactive monomer components from which the polymer is made.

In another embodiment, one to four $R^1$ comprises a vinyl carbonate or carbamate of the formula:

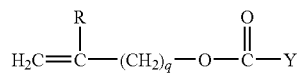

Formula II wherein: Y denotes O—, S— or NH—;
R denotes, hydrogen or methyl; d is 1, 2, 3 or 4; and q is 0 or 1.

The silicone-containing vinyl carbonate or vinyl carbamate monomers specifically include: 1,3-bis[4-(vinyloxycarbonyloxy)but-1-yl]tetramethyl-disiloxane; 3-(vinyloxycarbonylthio) propyl-[tris(trimethylsiloxy)silane]; 3-[tris(trimethylsiloxy)silyl]propyl allyl carbamate; 3-[tris(trimethylsiloxy)silyl]propyl vinyl carbamate; trimethylsilylethyl vinyl carbonate; trimethylsilylmethyl vinyl carbonate, and

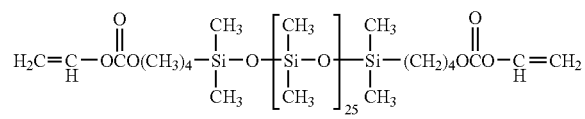

Where biomedical devices with modulus below about 200 are desired, only one $R^1$ shall comprise a monovalent reactive group and no more than two of the remaining $R^1$ groups will comprise monovalent siloxane groups.

Another class of silicone-containing components includes polyurethane macromers of the following formulae:
Formulae IV-VI

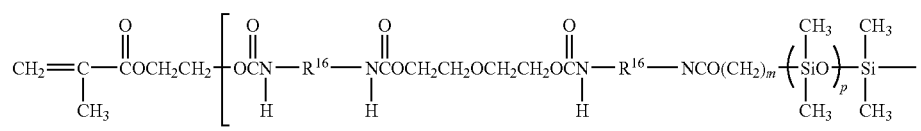

(*D*A*D*G)$_a$*D*D*E$^1$;

E(*D*G*D*A)$_a$*D*G*D*E$^1$ or;

E(*D*A*D*G)$_a$*D*A*D*E$^1$ wherein:
D denotes an alkyl diradical, an alkyl cycloalkyl diradical, a cycloalkyl diradical, an aryl diradical or an alkylaryl diradical having 6 to 30 carbon atoms,
G denotes an alkyl diradical, a cycloalkyl diradical, an alkyl cycloalkyl diradical, an aryl diradical or an alkylaryl diradical having 1 to 40 carbon atoms and which may contain ether, thio or amine linkages in the main chain;

* denotes a urethane or ureido linkage;
$a$ is at least 1;
A denotes a divalent polymeric radical of formula:

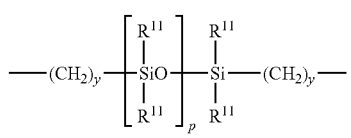

Formula VII $R^{11}$ independently denotes an alkyl or fluoro-substituted alkyl group having 1 to 10 carbon atoms which may contain ether linkages between carbon atoms; y is at least 1; and p provides a moiety weight of 400 to 10,000; each of E and $E^1$ independently denotes a polymerizable unsaturated organic radical represented by formula:

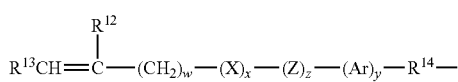

Formula VIII wherein: $R^{12}$ is hydrogen or methyl; $R^{13}$ is hydrogen, an alkyl radical having 1 to 6 carbon atoms, or a —CO—Y—$R^{15}$ radical wherein Y is —O—, Y—S— or —NH—; $R^{14}$ is a divalent radical having 1 to 12 carbon atoms; X denotes —CO— or —OCO—; Z denotes —O— or —NH—; Ar denotes an aromatic radical having 6 to 30 carbon atoms; w is 0 to 6; x is 0 or 1; y is 0 or 1; and z is 0 or 1.

A preferred silicone-containing component is a polyurethane macromer represented by the following formula:

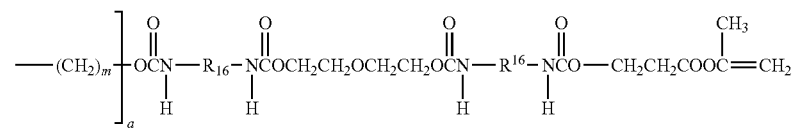

Formula IX

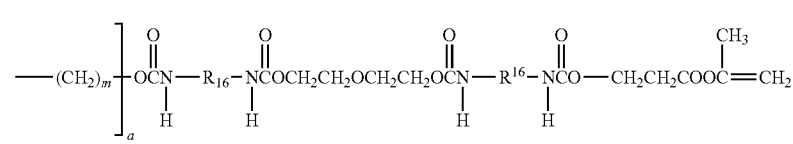

wherein $R^{16}$ is a diradical of a diisocyanate after removal of the isocyanate group, such as the diradical of isophorone diisocyanate. Another suitable silicone containing macromer is compound of formula X (in which x+y is a number in the range of 10 to 30) formed by the reaction of fluoroether, hydroxy-terminated polydimethylsiloxane, isophorone diisocyanate and isocyanatoethylmethacrylate.

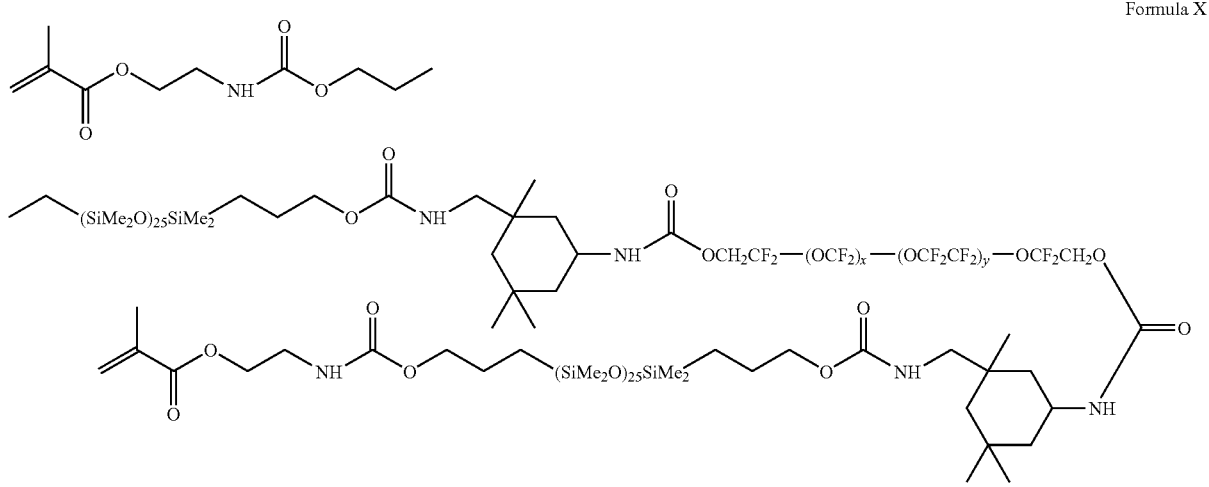

Formula X

Other silicone containing components suitable for use in this invention include macromers containing polysiloxane, polyalkylene ether, diisocyanate, polyfluorinated hydrocarbon, polyfluorinated ether and polysaccharide groups; polysiloxanes with a polar fluorinated graft or side group having a hydrogen atom attached to a terminal difluoro-substituted carbon atom; hydrophilic siloxanyl methacrylates containing ether and siloxanyl linkanges and crosslinkable monomers containing polyether and polysiloxanyl groups. Any of the foregoing polysiloxanes can also be used as the silicone-containing component in this invention.

In some embodiments an ophthalmic lens comprising silicone can also include an agent which increases the wettability of the lens, such as, for example, polyvinylpyrrolidone (PVP) or povidone. The weeting agent is preferably located throughout the bulk of the lens material and thus available on the surface even after some poriton of the bulk has been removed via laser ablation.

Molds

Referring now to FIG. 1, a diagram of an exemplary mold for an ophthalmic lens is illustrated. As used herein, the terms "mold" and "mold assembly" refer to a form 100 having a cavity 105 into which a lens forming mixture can be dispensed such that upon reaction or cure of the lens forming mixture (not illustrated), an ophthalmic lens of a desired shape is produced. The molds and mold assemblies 100 can include more than one "mold parts" or "mold pieces" 101-102. The mold parts 101-102 can be brought together such that a cavity 105 is formed between the mold parts 101-102 in which a lens can be formed. This combination of mold parts 101-102 is preferably temporary. Upon formation of the lens, the mold parts 101-102 can again be separated for removal of the lens.

At least one mold part 101-102 has at least a portion of its surface 103-104 in contact with the lens forming mixture such that upon reaction or cure of the lens forming mixture that surface 103-104 provides a desired shape and form to the portion of the lens with which it is in contact. The same is true of at least one other mold part 101-102.

Thus, for example, in a preferred embodiment a mold assembly 100 is formed from two parts 101-102, a female concave piece (front piece) 102 and a male convex piece (back piece) 101 with a cavity formed between them. The portion of the concave surface 104 which makes contact with lens forming mixture has the curvature of the front curve of an ophthalmic lens to be produced in the mold assembly 100 and is sufficiently smooth and formed such that the surface of a ophthalmic lens formed by polymerization of the lens forming mixture which is in contact with the concave surface 104 is optically acceptable.

In some embodiments, the front mold piece 102 can also have an annular flange integral with and surrounding circular circumferential edge 108 and extends from it in a plane normal to the axis and extending from the flange (not shown).

The back mold piece 101 has a central curved section with a concave surface 106, convex surface 103 and circular circumferential edge 107, wherein the portion of the convex surface 103 in contact with the lens forming mixture has the curvature of the back curve of a ophthalmic lens to be produced in the mold assembly 100 and is sufficiently smooth and formed such that the surface of a ophthalmic lens formed by reaction or cure of the lens forming mixture in contact with the back surface 103 is optically acceptable. Accordingly, the inner concave surface 104 of the front mold half 102 defines the outer surface of the ophthalmic lens, while the outer convex surface 103 of the base mold half 101 defines the inner surface of the ophthalmic lens.

Preferred embodiments can also include a polyolefin of one or more of: polypropylene, polystyrene, polyethylene, polymethyl methacrylate, and modified polyolefins.

Thermoplastics that can be compounded with an additive can include, for example, one or more of: polypropylene, polystyrene and alicyclic polymers.

In some preferred methods of making molds 100 according to the present invention, injection molding is utilized according to known techniques, however, embodiments can also include molds fashioned by other techniques including, for example: lathing, diamond turning, or laser cutting.

Typically, lenses are formed on at least one surface of both mold parts 101-102. However, if need be one surface of the lenses may be formed from a mold part 101-102 and the other lens surface can be formed using a lathing method, or other methods.

As used herein "lens forming surface" means a surface 103-104 that is used to mold a lens. In some embodiments, any such surface 103-104 can have an optical quality surface finish, which indicates that it is sufficiently smooth and formed so that a lens surface fashioned by the polymerization of a lens forming material in contact with the molding surface is optically acceptable. Further, in some embodiments, the lens forming surface 103-104 can have a geometry that is necessary to impart to the lens surface the desired optical characteristics, including without limitation, spherical, aspherical and cylinder power, wave front aberration correction, corneal topography correction and the like as well as any combinations thereof.

Methods

The following method steps are provided as examples of processes that may be implemented according to some aspects of the present invention. It should be understood that the order in which the method steps are presented is not meant to be limiting and other orders may be used to implement the invention. In addition, not all of the steps are required to implement the present invention and additional steps may be included in various embodiments of the present invention.

Figure 2:
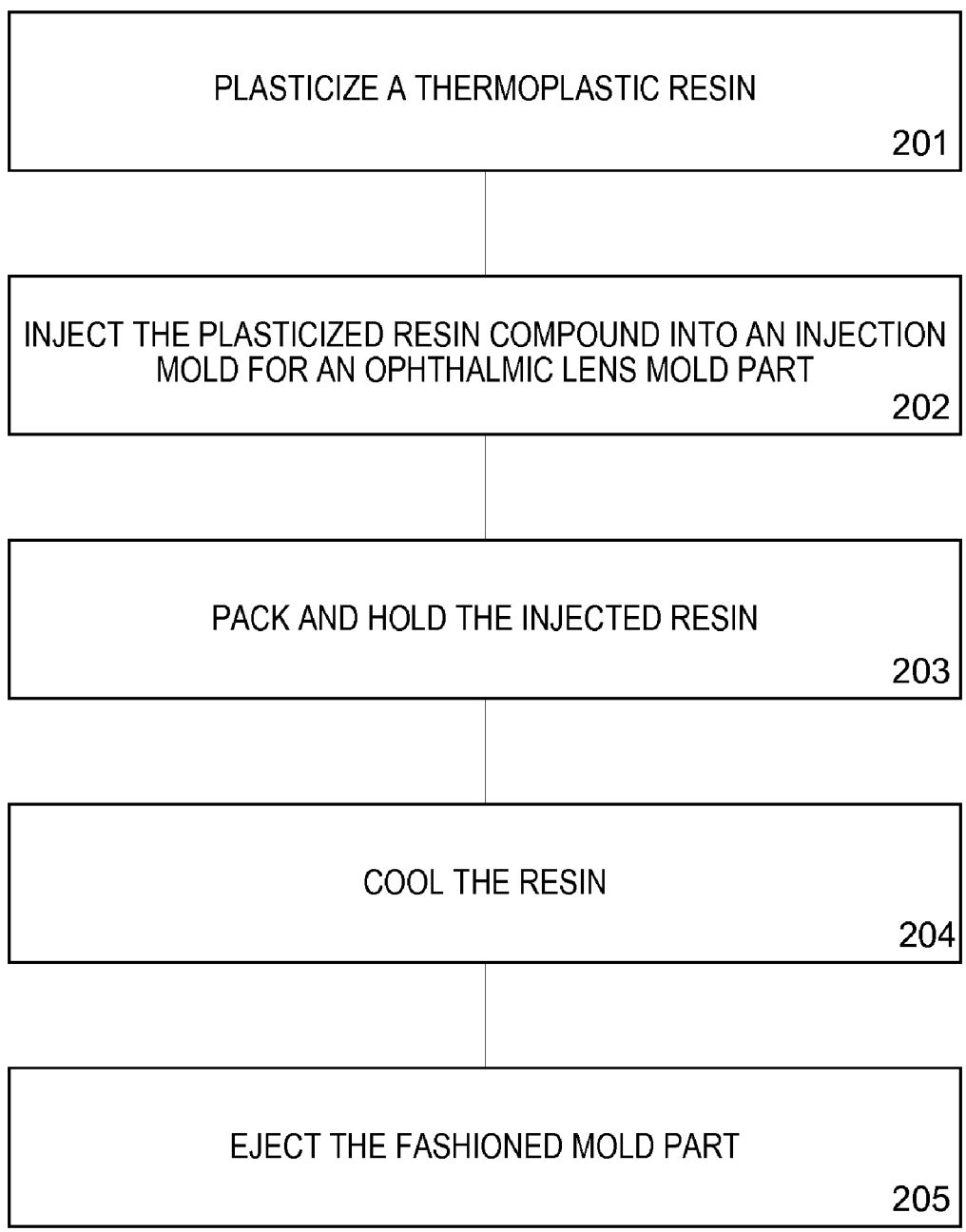
FIG. 2 illustrates a flow chart of exemplary steps that can be executed while implementing some embodiments of the present invention.

Referring now to FIG. 2, a flowchart illustrates exemplary steps that may be used to implement the present invention. At 201, a thermoplastic is plasticized and prepared for use in an injection molding process. Injection molding techniques are well known and preparation typically involves heating resin pellets beyond a melting point.

At 202, the plasticized resin is injected into an injection mold shaped in a fashion suitable for creating an ophthalmic lens mold part 101-102. At 203, the injection mold is typically placed in a pack and hold status for an appropriate amount of time, which can depend, for example upon the resin utilized and the shape and size of the mold part. At 204, the formed mold part 101-102 is allowed to cool and at 205, the mold part 101-102 can be ejected, or otherwise removed from the injection mold.

Referring now to FIG. 3, some embodiments of the present invention include methods of making an ophthalmic lens comprising, consisting essentially of, or consisting of the following steps. At 301 one or more mold parts 101-102 are created. At 302, an uncured lens formulation is dispensed onto the one or more mold parts 101-102 and at 303, the lens formulation is cured under suitable conditions. Additional steps can include, for example, hydrating a cured lens until it releases from a mold part 101-102 and leaching acute ocular discomfort agents from the lens.

As used herein, the term "uncured" refers to the physical state of a lens formulation prior to final curing of the lens formulation to make the lens. In some embodiments, lens formulations can contain mixtures of monomers which are cured only once. Other embodiments can include partially cured lens formulations that contain monomers, partially cured monomers, macromers and other components.

As used herein, the phrase "curing under suitable conditions" refers to any suitable method of curing lens formulations, such as using light, heat, and the appropriate catalysts to produce a cured lens. Light can include, in some specific examples, ultra violet light. Curing can include any exposure of the lens forming mixture to an actinic radiation sufficient to case the lens forming mixture to polymerize.

At 304, in some embodiments, the lens can optionally be released from the mold part and at 305 positioned on a mandrel. Other embodiments include allowing the lens to remain adhered to one of the lens mold parts while the lens if exposed to the laser energy and at least a portion of the lens material is removed via ablation.

At 306, the lens is exposed to laser energy and at 307 at least a portion of the ophthalmic lens is modified by the laser energy. Modification can include ablation of some portion of the lens.

In some embodiments, a lens can be exposed to, or even encompassed by a solution, such as, for example a saline solution during ablation. The saline solution can maintain the lens in a hydrated state during ablation and facilitate the control of curling during exposure to the laser.

Additional embodiments can include ablation in an environment that has reduced oxygen content, such as an environment with less than 20% oxygen of an environment that is essentially oxygen free, such as an ambient atmosphere including primarily one or both of: helium or nitrogen; or an environment of essentially a vacuum.

At 308, debris, such as non-wettable kerf is removed from a surface of the lens. Removal of kerf can be accomplished by washing with a solution or an air bath which blows away debris. At 309, the lens is coated. Coating can include any known ophthalmic lens coating, such as, for example, coatings to increase comfort of a silicon lens.

As user herein, laser ablation can include a process wherein material is removed from a opthalmic lens by irradiating it with a laser beam. At relatively lower laser flux, ophthalmic lens material is heated by the absorbed laser energy and evaporates or sublimes. At relatively higher laser flux, ophthalmic lens material can be converted to a plasma. Usually, laser ablation refers to removing material with a pulsed laser, but it is possible to ablate material with a continuous wave laser beam if the laser intensity is high enough.

The depth over which the laser energy is absorbed, and thus the amount of ophthalmic lens material removed by a single laser pulse, can be varied according to the ophtalmic lens material's optical properties and the laser wavelength and power.

Laser pulses can be precisely controlled by varying the duration and flux of the laser, such as, for example, from milliseconds to femtoseconds. Short laser pulses can remove ophthalmic lens material so quickly that the surrounding material absorbs very little heat.

Apparatus

Figure 4:
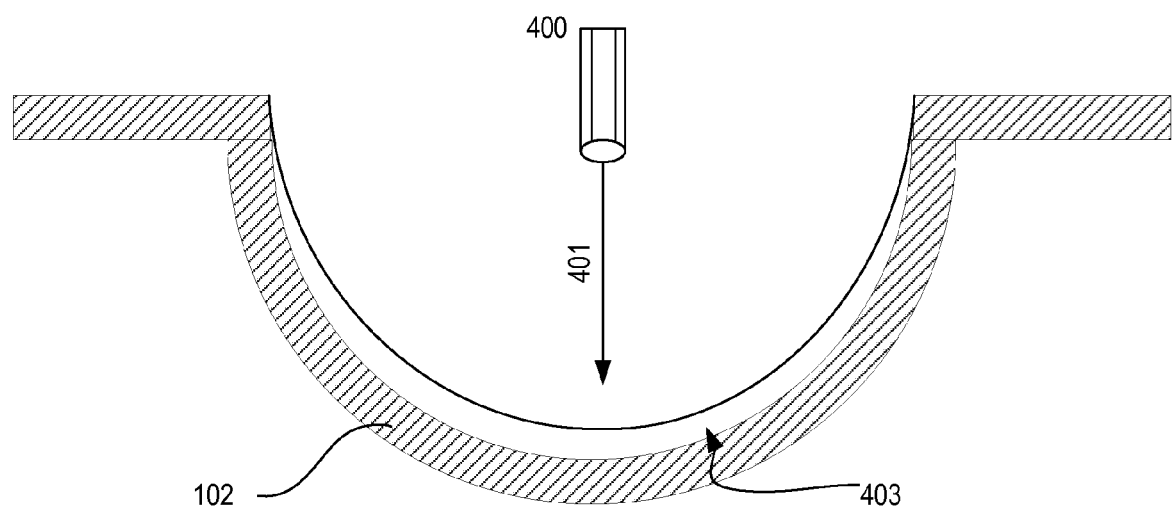
FIG. 4 illustrates a lens in a mold part and positioned for laser ablation.

Referring now to FIG. 4, a laser apparatus 400 is positioned proximate to an ophthalmic lens 403, wherein the ophthalmic lens 403 is adhered to a mold part 102. As illustrated, in some embodiments, the mold part is functional to support and secure the ophthalmic lens during modification with the laser energy 401 emitted from the laser apparatus 400.

Figure 5:
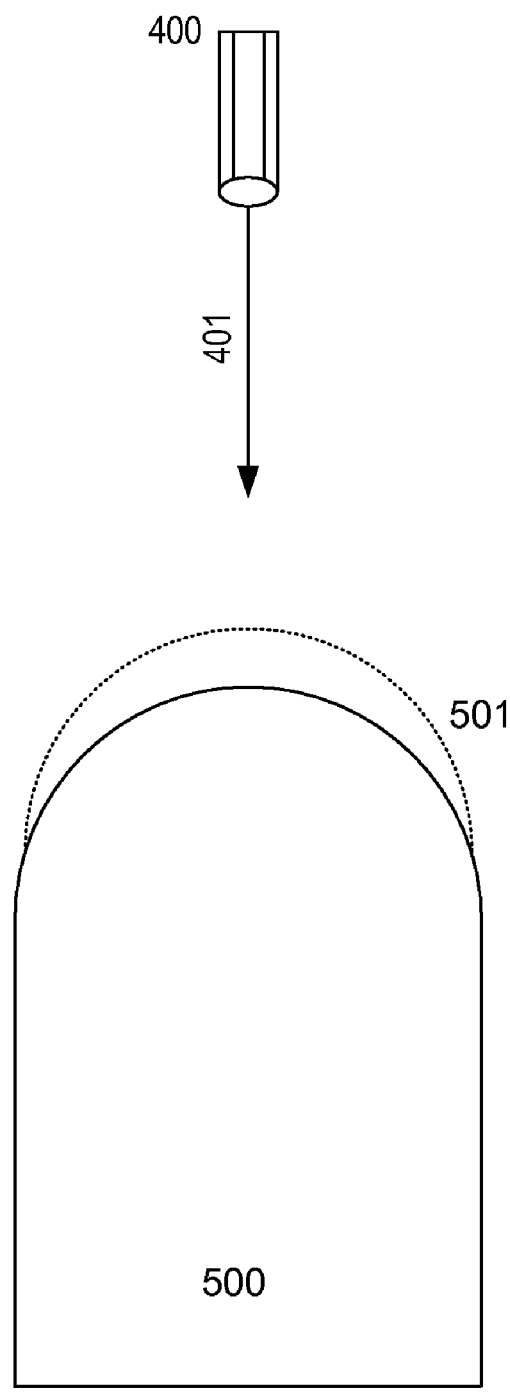
FIG. 5 illustrates a lens on a mandrel and positioned for laser ablation.

Referring now to FIG. 5, a laser apparatus 400 is positioned proximate to an ophthalmic lens 501, wherein the ophthalmic lens 501 is secured to a mandrel 500. As illustrated, in some embodiments, the mandrel 500 is functional to support and secure the ophthalmic lens during modification with the laser energy 401 emitted from the laser apparatus 400. Some embodiments can include an indication on the mandrel to facilitate lens positioning. For example, the indication may include a circular shape on the mandrel which centers the lens during an ablation process.

EXAMPLES

The following non-limiting examples illustrate some embodiments of the present invention that can be used for making a custom contact lens via a laser device:

A patient goes to the doctor for an exam and is determined to be a good candidate for a custom lens. This may be due to high order aberration ("HOA") or a need for a higher precision lens.

The patient wears a standard, preferably stabilized contact lens and in some embodiments, a fitting lens that is designed to aid the manufacturer in designing a custom lens. This fitting lens has stability and measuring points incorporated in the lens that assist with measuring the rotational position of the lens and the decentration of the eye in relation to the patients eye.

One or more patient variable, such as, for example one or more of: metrics of a patients eye; a specific need, conditions of use; a symptom; a medical condition, or other variable is input into t computerized system to determine a modification of a formed lens or a lens design. In one example a wavefront can be determined for an eye via an abberometer, such as a COAS or Wavescan device. This wavefront can capture residual optical errors that either a standard lens or fitting lens is not correcting for.

In some embodiments wavefront file can be sent to a lens manufacturer preferably through electronic means such as the phone lines or Internet, and an order is placed for a specific amount of lenses.

The manufacturer receives the wavefront files and lens order and generates a contact lens design via computer. This design may simply be two optical surfaces and a specified lens material, preferably a silicone contact lens with an internal wetting agent such as PVP.

Other embodiments include calculation of a lens modification to a preexisting lens design or lens design based upon the patient variables. One or more of the modification parameters and the design parameters can then be transmitted to apparatus suitable for causing the modifications or manufacture of a new design.

In some embodiments, a computerized process can be used to generate a starting design or shape prior to modification. Preferred embodiments can include a production run lens design available by prescription. Other embodiments can include an eye care practitioner determining a starting shape. A starting shape can be based, for example upon consideration of an amount of material that will need to be removed via laser ablating or a calculation of a minimal cycle time.

A starting shape can be formed, such as via cast molding or 2) "pulled" from inventory. If it is pulled from inventory, it must be removed from the package.

The lens is positioned for laser ablation. If the starting shape is made in-line then there are several options for positioning: 1) lens is attached to the base curve post demold, 2) the lens is attached to the front curve post demold, 3) the lens is positioned onto a mandrel post hydration, or 4) the lens is positioned onto a mandrel post saline exchange. If the starting shape lens is taken out of inventory, then it will be positioned on a mandrel (concave or convex) or other device that holds the lens in place w/o distortion during laser ablation. The lens is preferably hydrated at this stage—equalized in dimensions in DI water or saline solution. However, the lens might be in a dry condition—less than 10% water. There are many options for positioning the contact lens during ablation as those skilled in the art can deduce.

The lens is positioned under the laser device by either 1) preferably the laser device has software similar to LASIK eye-tracking software that "finds" the center of the lens. This can be done by locating features (optical zone ring, 123, scribe, etc marks on the lens) or 2) the lens is accurately positioned under the laser so that the center of the lens is always positioned in the same location.

Once the laser device "knows" where the center of the lens is, either the laser device or the lens itself is moved so that the ablation is done at the position needed for the patient's pupil. For example, the laser device or lens (positioned on a mandrel) would move 300 microns nasal and 0.050 microns superior to represent the patient's pupil position relative to the center of the lens. This location was derived in the doctor's office and noted above.

A laser device (preferably a 193 nm excimer laser, but any wavelength that effectively ablates the contact lens material without thermal degradation) laser ablates the resulting wavefront contour either onto the anterior or posterior surface of the lens in an inert environment (Nitrogen, helium, etc >90%.)

The lens is removed from the mandrel and is optionally cleaned of debris and/or re-hydrated.

The lens does not require a post laser ablation process to make the lens wettable.

The lens is sterilized via autoclave or UV sterilization.

The lens is packaged and shipped to the customer (or doctor's office) for dispensing.

Example 1

Laser ablation of custom contact lenses using actual wavefront files have been produced via this technique:

A patient was refracted in the clinic under the care of an optometrist, and received the best fitting Acuvue Advance for Astigmatism (AAFA) contact lenses—which are a rotationally stabilized, silicone contact lens. For this patient the prescription was −1.75/−0.75/160 OD, and −1.75/−0.75/030 OS. This acted as the fitting lens. The pupil position was not measured for this experiment. A COAS measurement of the wavefront was taken while wearing the lens to act as a baseline. The patient was found to have a considerable amount of coma—which is labeled $Z(3, -1)$, which is a HOA.

While wearing the AAFA lenses, the patient's wavefront of each eye is generated via WaveScan abberometer and placed onto a memory stick. A WaveScan was used because it "talks" to the specific LASIK device that was being used.

The memory stick was inserted into a VISX Star S4 LASIK device and the built-in algorithm generated the ablation routine, which included the repetition rate, variable spot size, spot location, # pulses.

A new lens (−1.75/−0.75/160 OD, and −1.75/−0.75/030 OS) in of a sterile package was collected from existing inventory.

The lens was positioned on a quartz mandrel (8.3 mm radius) to hold the lens in place during laser ablation. The lens was kept wet via an eye-dropper, but was not supersaturated.

The LASIK device (193 nm excimer laser, 160 mJ/cm$^2$ target fluence) ablated the anterior surface of the lens and haze was seen on the surface of the lens. It was later found that ablating the silicone lenses under an inert (helium-estimate of 2 cu. ft per minute through a ½" hose positioned just above the lens) environment significantly reduced the haze. Ablating dry lenses (lenses left on a quartz mandrel for several days)) created debris that fell back to the surface of the lens.

The lens was removed from the quartz mandrel and placed into a glass vial containing standard saline solution.

The lenses were visually inspected for defects.

The lenses were sterilized via autoclave in the glass vial.

The lenses were measured for contact angle via Sessile Drop Test and the silicone lenses did not hold a drop of water—indicating a low contact angle.

An optometrist fit the lenses on the patient and COAS measurements were taken, and compared to the original baseline measurement. The patient had −0.4579 $Z(3, -1)$ coma when best fitted to the AAFA lens and this coma was reduced to −0.1296 post laser ablation. The patient reported that halo effects on a bright pin-point light source (a symptom of coma) were reduced. The optometrist observed that the post laser ablated lens surface was uniformly wet, and the patient said that the lens was quite comfortable.

CONCLUSION

The present invention is described above and further defined by the claims below.

What is claimed is:

1. A method of modifying an ophthalmic lens, the method comprising:
   receiving digital data into an apparatus for controlling an ablation process wherein the data relates to a modification to the ophthalmic lens;
   calculating in the apparatus for controlling an ablation process, a control pattern for a laser apparatus based upon the data related to the modification;
   calculating a control sequence for operating the laser apparatus;
   securing the ophthalmic lens in a position to receive laser energy;
   exposing the ophthalmic lens to laser energy based upon the control sequence, wherein the ophthalmic lens is hydrated with saline solution prior to and during the lens being exposed to laser energy and the ophthalmic lens is contained in an inert atmosphere during ablation; and
   removing kerf from the surface of the lens.

2. The method of claim 1, wherein the kerf is removed from the lens via a wash in a solution.

3. The method of claim 1, wherein the kerf is removed from the lens via exposure to an air wash.

4. The method of claim 2 wherein the data comprises eye topography data.

5. The method of claim 2 additionally comprising the step of applying a coating to the lens subsequent to the step of exposing the ophthalmic lens to laser energy.

6. The method of claim 2 additionally comprising the step of receiving a starting shape of the ophthalmic lens prior to modification.

7. The method of claim 2 wherein the ophthalmic lens comprises a silicone material.

8. The method of claim 1 wherein the data related to the modification for the ophthalmic lens comprises an intended use for the ophthalmic lens, wherein the intended use comprises facilitating far sighted visual performance.

9. The method of claim 1 wherein the step of exposing the ophthalmic lens to laser energy is accomplished in an environment with an oxygen content of less than 20 percent.

10. The method of claim 1 additionally comprising the steps of positioning the lens on a mandrel and aligning the mandrel to receive laser energy.

11. The method of claim 1 additionally comprising the steps of positioning a cast mold to which the lens is adhered to receive laser energy.

12. The method of claim 2 wherein the laser energy is provided by an excimer laser apparatus.

13. The method of claim 2 wherein exposure of the ophthalmic lens to laser energy is sufficient to ablate a portion of the ophthalmic lens.

14. The method of claim 2 wherein the data received related to a modification to the ophthalmic lens is received under the direction of an eye care practitioner.

15. The method of claim 14 wherein the data received related to a modification to the ophthalmic lens is received as electronic digital data.

16. The method of claim 2 additionally comprising the steps of repackaging the ophthalmic lens and sterilizing the modified lens.

* * * * *